United States Patent [19]

Kistner et al.

[11] Patent Number: 5,080,531
[45] Date of Patent: Jan. 14, 1992

[54] MULTIPLE CHAMBER CARTRIDGE FOR ADHESIVE ANCHORING OF FASTENERS IN A BASE

[75] Inventors: Herbert Kistner, Freiburg; Christian Weber, Emmendingen, both of Fed. Rep. of Germany

[73] Assignee: Upat GmbH & Co., Emmendingen, Fed. Rep. of Germany

[21] Appl. No.: 573,678

[22] Filed: Aug. 27, 1990

Related U.S. Application Data

[62] Division of Ser. No. 315,892, Feb. 14, 1989.

[51] Int. Cl.⁵ .............................................. E21D 20/02
[52] U.S. Cl. .................................. 405/259.6; 525/31; 525/524
[58] Field of Search .................. 405/260, 261; 525/31, 525/524

[56] References Cited

U.S. PATENT DOCUMENTS

| | | |
|---|---|---|
| 3,324,663 | 6/1967 | McLean . |
| 3,463,749 | 8/1969 | Taft ........................................ 260/22 |
| 3,657,379 | 4/1972 | Hilbelink et al. .................... 260/824 |
| 3,915,297 | 10/1975 | Rausch ................................ 206/219 |
| 3,968,016 | 7/1976 | Wismer .............................. 525/31 X |
| 4,038,339 | 7/1977 | Foster ................................ 525/31 X |
| 4,105,114 | 8/1978 | Knox et al. ......................... 206/219 |
| 4,343,921 | 8/1982 | Piestert ................................ 525/310 |
| 4,518,283 | 5/1985 | Gebauer et al. ..................... 405/260 |
| 4,568,719 | 2/1986 | Tada et al. ........................ 525/524 X |
| 4,616,050 | 7/1990 | Gebauer ........................... 405/260 X |
| 4,729,696 | 3/1988 | Goto et al. .......................... 405/261 |
| 4,944,819 | 10/1986 | Simmons et al. .................. 405/26 X |
| 4,956,425 | 9/1990 | Hefner et al. ..................... 525/531 X |

FOREIGN PATENT DOCUMENTS

| | | |
|---|---|---|
| 1205038 | 9/1959 | Fed. Rep. of Germany . |
| 1811590 | 6/1970 | Fed. Rep. of Germany ........ 525/31 |
| 994904 | 6/1965 | United Kingdom .................. 525/31 |

OTHER PUBLICATIONS

Soviet "Inventions Illustrated", Sections P,Q: General/Mechanical Week K11, issued Apr. 27, 1983.

Primary Examiner—Randolph A. Reese
Assistant Examiner—Arlen L. Olsen
Attorney, Agent, or Firm—Baker & Daniels

[57] ABSTRACT

A destructible multiple chamber cartridge for the in situ production of synthetic resin bodies from a reactive set for fastening anchoring elements in boreholes. The reactive set comprises between 18 and 25 parts by weight of a preaccelerated resin component composed of 3–60 parts by weight of a vinyl ester epoxy resin, 28–45 parts by weight of one or several ethylenically unsaturated monomer compounds, 63–3 parts by weight of an unsaturated polyester, and 10–0.1 parts by weight of epoxy resin. The reactive set further comprises 0.4–1.2 parts by weight of a hardener component comprising an organic peroxide, and 40–55 parts by weight of a filler component. The hardener component and the preaccelerated resin component are contained separate from each other in different chambers. When the fastening element is driven into the borehole, the cartridge is destroyed and the components are mixed and hardened, forming the synthetic resin body.

14 Claims, No Drawings

MULTIPLE CHAMBER CARTRIDGE FOR ADHESIVE ANCHORING OF FASTENERS IN A BASE

CROSS REFERENCE TO RELATED APPLICATIONS

This application is a division of application Ser. No. 07/315,892, filed Feb. 14, 1989.

BACKGROUND OF THE INVENTION

The invention, for one, concerns a reactive set for producing a synthetic resin body used for anchoring fasteners in a base through employment of destructible multiple chamber cartridges. Specifically, the invention is geared to a specific combination of components of the reactive set for production of a synthetic resin body, a destructible multiple chamber cartridge for anchoring fasteners in a base, and an anchoring process where the multiple chamber cartridge contains the specific reactive set.

It has been known for a long time to use curable synthetic resins for the safe fastening of anchoring rods and similar devices in solid rock, masonry, concrete and similar materials. The starting components of the synthetic resin and synthetic resin hardener are separately brought to the point of fastening and mixed there by driving the fastener in. Thus, the formation of the cured synthetic resin body that glues the fastener to the base is initiated only when the fastener is contained in its final position.

The widespread popularity of this technique is attributable, among others, to the use of destructible cartridges which permit a convenient introduction of resin components and synthetic resin hardeners in boreholes for anchoring rods and, moreover, facilitate the storage, transport and dosing of the reactive starting materials of the synthetic resin body.

Cartridges containing reactive sets for the production of cured synthetic resin bodies were described already in the German patent publication 12 05 038, in conjunction with a process for the fastening of anchoring rods without spreader head in the anchored construction of mining spaces. Concerned there are glass or bakelite cartridges into whose charge from curable polyester or epoxy resin and similar or larger quantity by weight of quartz sand or meal a capsule is introduced that contains the hardener. According to this document, organic peroxides are used in conjunction with polyesters. In the case of preaccelerated epoxy resins, an amine hardener is used. Although cartridges with reaction sets of that type have been used for several years in the fastening technology, they are associated with considerable drawbacks. These consist in the slow curing of preaccelerated epoxy resins with amine hardeners so that, when a quick load bearing capability of the fastener is required, the glass cartridge and the anchoring rod need to be preheated to temperatures above 150° C. With the peroxide-cured polyester resins it proves to be disadvantageous that they are insufficiently resistant to chemicals, specifically not resistant to alkali. Especially in a basic base this leads in the long run to a reduction of the mechanical properties of the synthetic resin body. Moreover, such cured polyester resins also display a relatively high water absorption, which in conjunction with metallic fasteners may cause corrosion problems.

To eliminate the disadvantages of such prior materials, the European patent application 0 150 555 (U.S. Pat. No. 4,729,696) suggested dual chamber cartridges where a fine-grained, natural or synthetic mineral filler, together with a vinyl ester epoxy resin on acrylate or methacrylate basis, is contained in the inner or outer chamber of a dual chamber cartridges constructed of two nested glass cylinders while the hardener—an organic peroxide—is contained in the respective other chamber. The peculiarity of cartridges according to the European patent application 0 150 555 consists in the fact that a reactive vinyl monomer is admixed to the resin component.

The synthetic resin substances according to the European patent application 0 150 555 represent a significant advancement over previously known resin compositions insofar as, for one, they cure faster than previously used epoxy resins and, for another, they are in terms of alkali resistance superior to the previously used polyester resins. Nonetheless, also the synthetic resin bodies which according to the recipe taught by the European patent application are obtained upon crushing the glass cartridges and curing of the components of the reaction set have considerable disadvantages: for one, such synthetic resin bodies do not represent a sufficiently effective diffusion barrier against reactive compounds, such as hydrochloric acid or diffusing water vapor. This relatively high permeability to low-molecular substances causes ultimately a reduction of the corrosion resistance of the metallic fastener. Another grave disadvantage of anchorings obtained with synthetic resin bodies according to the specification of the European patent application 0 150 555 is constituted by its mechanical performance. Under sustained load, synthetic resin bodies obtained in this way tend to soften. As a result of the resin matrix creepage caused thereby, a safe anchoring over longer periods of time cannot be guaranteed with such synthetic resin material under sustained load, due to the risk of fastener slippage. Thus, this resin type is unsuited for many applicational areas in construction where the fastener must safely withstand decades of tractive stress.

This disadvantage is amplified yet in that the somewhat satisfactory curing speed, as a result of which the fastener can be stressed a relatively short time thereafter, is caused by a high percentage of hardener component in the resin recipe. The high percentage of organic peroxide such as taught in the European patent application 0 150 555, for one, causes a quick curing of the synthetic resin mixture though, while on the other hand it has the undesirable side effect of promoting also the quick aging of the synthetic resin body. Given with the chemical changes which in the course of time reduce the adhesion of the resin to the surrounding base and to the fastener and adversely affect the inner structure and thus the strength of the synthetic resin substance itself (brittling) is another risk factor which makes the long term use problematic.

Disadvantageous, futhermore, is that a curing time of several days must still be allowed, despite a comparatively high curing speed at normal temperatures (25° C.), and even elevated temperatures (35° C.) require curing times in the range of hours, until the fastener can be subjected to load. For many practical purposes where cost intensive waiting periods are caused in that an anchored fastener cannot be subjected to load yet, the application of the teaching of the European patent application 0 150 555 is giving rise to problems.

Another negative aspect of the prior art is the dissatisfactory shelf life of the synthetic resin components in the cartridges, especially at elevated temperature.

The problem underlying the invention is to provide a reactive set, specifically for use in multiple chamber cartridges, for the production of a synthetic resin body that causes the anchoring of fasteners in the base and is characterized in that it produces after a short curing time highly loadable anchorings which remain consistently stable under mechanical sustained load, display a high resistance to acid and alkali, form an effective diffusion barrier to low-molecular compounds and possess an equally high adhesion to metals and natural and synthetic mineral materials and, when needed, can be so designed, without reducing their properties which are essential in practice, that a shelf life at elevated temperatures is given.

DESCRIPTION OF THE PREFERRED EMBODIMENT

This problem is solved through the reactive set for producing synthetic resin bodies, specifically for use in destructible multiple chamber cartridges for anchoring fasteners in a base, where in the reaction set there are contained a) a preaccelerated resin component containing the ester of an epoxy resin with acrylic and/or methacrylic acid and additionally one or several ethylenically unsaturated monomers as well as accelerators, polymerization inhibitors and, as the case may be, other usual additives.

b) a hardener component from an organic peroxide and c) a filler component, which reactive set is characterized in that it is composed of 18 to 25 parts by weight of the preaccelerated resin component 0.4 to 1.2 parts by weight of the hardener component and 40 to 55 parts by weight of the filler component while the preaccelerated resin component contains as ingredients A) 3 to 60 parts by weight of the vinyl ester epoxy resin B) 28 to 45 parts by weight of one or several ethylenically unsaturated monomer compounds and C) 63 to 3 parts by weight of an unsaturated polyester D) 10 to 0.1 parts by weight of epoxy resin.

The invention includes also a destructible multiple chamber cartridge for the in-situ production of synthetic resin bodies for fastening anchoring elements in boreholes, where the cartridge contains the inventional reactive set and where the organic peroxide hardener and the preaccelerated resin component are contained, separate from each other, in different chambers.

The inventional destructible multiple chamber cartridge is used in processes for anchoring a fastener in a base, by introducing in a borehole in the base a destructible multiple chamber cartridge that contains the components of a curable adhesive and where the cartridge is destroyed and the synthetic resin components are mixed by driving the fastener in, whereafter the synthetic resin cures.

Preferred embodiments of the invention are described in the subclaims.

Surprisingly, it was found that the combination of the components (A), (B), (C) and, as the case may be, (D) yields the combination of properties for solving the problem.

The addition of the epoxy resin (D)—with epoxy resins of the type bisphenol A being used preferably—leads to a considerably prolonged shelf life of the synthetic resin component of the reactive set at elevated temperature (sustained shelf life at temperatures around 50° C.).

Despite the very different reactivity of the components (A), (C) of the preaccelerated resin component, entirely unexpectedly, a homogenous and clear product is obtained. Surprising as well is the absence of gas bubble formation during the curing of the synthetic resin substance form the inventional reactive set. Ultimately, this guarantees a uniform plastic body. Already the absence of inhomogeneities in the synthetic resin itself eliminates a source of possible failures of the adhesive anchoring.

Without intending to derive a theory thereof, it is pointed out that in the novel reactive product a higher degree of cross-linking may result from the inventional reactive set with (A), (B), (C) and, as the case may be, (D) in the resin component. The considerably greater chemical resistance to state-of-the-art resins may be attributable to a better shielding of the ester groups caused thereby.

Such a structure may offer also a plausible explanation for the considerably greater resistance of the synthetic resin body from the inventional reactive set to diffusing mediums. It is pointed out especially that a high curing speed is given with the inventional reactive set, despite the comparatively very low amount of peroxide hardener. Preferred with regard to its balanced reactivity, miscibility under the threading conditions of the anchoring rod to be fastened and to the obtainable sustained load bearability of the resulting resin body are reactive sets which contain in the vinyl ester epoxy resin an epichlorohydrine epoxy resin of the type bisphenol A. Regarding the handlability and reactivity, the vinyl ester epoxy resin (A) preferably has in general a mean mole mass of 450 to 1200 Dalton, an ester number of 80 to 150 mg KOH/g resin and, when available in the form of a solution of 55 to 70% wt. (A), that it has a viscosity of 400 to 1000 mPas at 23° C.

Due to its satisfactory reactivity and cost advantages associated with simple accessibility, styrene and/or methyl methacrylate is especially suited as ethylenically unsaturated monomer (B).

As regards their chemical nature, specifically unsaturated polyesters on the basis of o-phthalic acid and/or m-phthalic acid or isophthalic acid with ethylene glycol and/or propylene glycol and/or trycyclodecan dimethanol and/or neopentyl glycol are suited as polyester resins (C). Regarding the reactivity and handlability, flow performance and miscibility, it proves to be favorable to use polyester resins (C) whose ester number ranges from 180 to 320 mg KOH/g resin and which, when available in the form of a solution of 50 to 70% (C) monomer used, have a viscosity of 800 to 6,000 mPa s at 23° C. Especially suited as epoxy resin component (D) are such whose epoxy equivalent weight ranges from 160 to 200 g/equivalent and their viscosity from 2,500 to 4,000 mPas at 23° C.

The inventional reactive set is preferably used in a multiple chamber cartridge containing the hardener and the preaccelerated resin component in different chambers. The filler may be contained, along with the preaccelerated synthetic resin, in one chamber. This arrangement suggests itself when the cartridge is fashioned as a dual chamber cartridge, such as customary in the art.

Surprisingly, especially good results can be achieved with regard to strength and durability of the anchoring of the fastener when observing in the design of the multiple chamber cartridge from glass a weight ratio of 20 to 35 parts by weight of cartridge glass at 18 to 25 parts by weight of the preaccelerated resin component of the inventional reactive set, 0.4 to 1.2 parts by weight of peroxide hardener and 40 to 55 parts by weight of the filler component.

The filler component consists preferably from fine-grained quartz, magnesia clinker, marble meal or similar.

The inventional procedure for anchoring a fastener in the base is suitably such that a destructible multiple chamber cartridge containing the inventional reactive set is in customary fashion introduced in a borehole in the base. Next, by driving the fastener in, the cartridge is destroyed, the hardener previously separated from the preaccelerated synthetic resin component is mixed with the material to be cured, thus initiating the in-situ curing reaction.

The following examples show the reduction of the present invention and illustrate the superior properties of the inventional combination over the art.

BLANK

Composition With Vinyl Ester Epoxy Resin

| | |
|---|---|
| vinyl ester epoxy resin | 60.00 g |
| monostyrene | 39.85 g |
| dimethyl p-toluidine | 0.15 g |
| | 100.00 g |

Ester number (EZ) = 60 mg KOH/g resin
viscosity at 23° C. = 600 mPa s
sustained shelf life, stored at 50° C. = 2 to 3 months.
This shelf life is insufficient.

EXAMPLE 1

| | |
|---|---|
| vinyl ester epoxy resin | 47.85 g |
| unsaturated neopentyl glycol m-phthalic acid polyester | 12.00 g |
| dimethyl p-toluidine | 0.15 g |
| monostyrene | 40.00 g |
| | 100.00 g |

EZ = 107 mg KOH/g resin
viscosity at 23° C. = 680 mPa s
shelf life, stored at 50° C. = at least 6 months

EXAMPLE 2

| | |
|---|---|
| vinyl ester epoxy resin | 31.00 g |
| unsaturated trycyclodecan dimethanol o.m-phthalic acid polyester | 30.85 g |
| dimethyl p-toluidine | 0.15 g |
| monostyrene | 38.00 g |
| | 100.00 g |

EZ = 150
viscosity at 23° C. = 1500 mPa s
shelf life, stored at 50° C. = at least 6 months

EXAMPLE 3

| | |
|---|---|
| vinyl ester epoxy resin | 46.40 g |
| unsaturated trycyclodecan dimethanol polyester | 11.60 g |
| dimethyl p-toluidine | 0.15 g |
| monostyrene | 41.85 g |
| | 100.00 g |

EZ = 93; viscosity at 23° C. = 834 mPa s
shelf life, stored at 50° C. = at least 6 months

EXAMPLE 4

| | |
|---|---|
| vinyl ester epoxy resin | 40.00 g |
| unsaturated trycyclodecan dimethanol polyester | 20.00 g |
| dimethyl p-toluidine | 0.15 g |
| monostyrene | 17.85 g |
| methyl methacrylate | 12.00 g |
| epoxy resin with epoxy equivalent 200 | 10.00 g |
| | 100.00 g | viscosity at 23° C. = 1250 mPas
shelf life, stored at 50° C. = at least 10 months

EXAMPLE 5

| | |
|---|---|
| vinyl ester epoxy resin, preaccelerated unsaturated trycyclodecan dimethanol | 3.00 g |
| polyester | 59.00 g |
| monostyrene | 38.00 g |
| | 100.00 g |

EZ = 220 KOH/g resin
viscosity at 23° C. = 2800 mPa s
shelf life, stored at 50° C. = at least 6 months

EXAMPLE 6

| | |
|---|---|
| vinyl ester epoxy resin, preaccelerated unsaturated isophthalic acid neopentyl | 60.00 g |
| glycol polyester | 8.00 g |
| monostyrene | 31.00 g |
| Epoxy resin, epoxy equivalent 200 | 1.00 g |
| | 100.00 g |

EZ = 84 KOH/g resin
viscosity at 23° C. = 550 mPa s
shelf life, stored at 50° C. = at least 10 months

EXAMPLE 7

| | |
|---|---|
| vinyl ester epoxy resin, preaccelerated unsaturated trycyclodecan dimethanol | 6.00 g |
| polyester | 63.00 g |
| monostyrene | 28.00 g |
| epoxy resin, epoxy equivalent 180 | 3.00 g |
| | 100.00 g |

EZ = 152 KOH/g resin, viscosity at 23° C. = 4200 mPa s
shelf life, stored at 50° C. = at least 10 months

EXAMPLE 8

| | |
|---|---|
| vinyl ester epoxy resin, preaccelerated unsaturated trycyclodecan dimethanol | 14.60 g |
| polyester | 40.00 g |

-continued

| monostyrene | 45.00 g |
| epoxy resin, epoxy equivalent 180 | 0.40 g |
| | 100.00 g |

EZ = 186 KOH/g resin; viscosity at 23° C. = 2000 mPa s
shelf life stored at 50° C. = at least 10 months

EXAMPLE 9

| vinyl ester epoxy resin, preaccelerated | 49.10 g |
| unsaturated trycyclodecan dimethanol polyester | 12.30 g |
| monostyrene | 38.50 g |
| epoxy resin, epoxy equivalent 200 | 0.10 g |
| | 100.00 g |

EZ = 110 KOH/g resin; viscosity at 23° C. = 750 mPa s
shelf life, stored at 50° C. = at least 10 months

EXAMPLE 10

Cartridge Size M 12 (Metric Threading)

| resin component according to example 1, preaccelerated with amine | 4.30 g |
| quartz (grain size 1.2-1.8 mm) | 8.20 g |
| dibenzoyl peroxide (20% in gypsum) | 0.54 g |
| cartridge glass (outside and inside cartridge) | 5.40 g |
| | 18.44 g |

Anchoring rod M 12×160, threaded section grade 12.9
curing time 0.5 h
concrete: B 50 actual strenght: 54.2 N/mm$^2$
mean extraction value X: KN-101.7
adhesive strength: N/mm$^2$-20.7 Failure: anchoring rod rupture

EXAMPLE 11

Cartridge Size M 12 (Metric Threading)

| resin component according to example 2, preaccelerated with amine | 3.60 g |
| quartz (grain size 0.5-1.8 mm) | 8.00 g |
| dibenzoyl peroxide (50% in phthalate softener) | 0.24 g |
| cartridge glass (outside and inside cartridge) | 5.45 g |
| | 17.29 g |

Anchoring rod M 12×160, 12.9
curing time 0.5 h
concrete: B 50 actual strength: 54.2 N/mm$^2$
mean extraction value X: KN-96.3
adhesive strength: N/mm$^2$-19.6
Failure: adhesive failure-anchoring rod rupture

EXAMPLE 12

Cartridge Size M 12 (Metric Threading)

| resin component according to example 3, preaccelerated with amine | 4.00 g |
| quartz (grain size 1.2-1.8 mm) | 8.80 g |
| dibenzoyl peroxide (50% in phthalate softener) | 0.26 g |
| cartridge glass (outside and inside cartridge) | 5.37 g |
| | 18.43 g |

Anchoring rod M 12×160, 12.9
curing time 0.5 h
concrete: B 50 actual strength: 54.2 N/mm$^2$
mean extraction value X: KN-99.9
adhesive strength: N/mm$^2$-20.4
Failure: adhesive failure through anchoring rod rupture

We claim:
1. A destructible multiple chamber cartridge for the in-situ production from a reactive set of synthetic resin bodies for fastening anchoring elements in boreholes, said reactive set containing:
   a) 18-25 parts by weight of a preaccelerated resin component containing as ingredients:
      A) 3-60 parts by weight of a vinyl ester epoxy resin,
      B) 28-45 parts by weight of styrene, methyl methacrylate or a mixture thereof, as ethylenically unsaturated monomer compounds,
      C) 63-3 parts by weight of an unsaturated polyester resin, which does not contain hydroxyl groups, and which is not a vinyl ester epoxy resin or an ester of a polyepoxide with an ethylenically unsaturated monocarboxylic acid, and
      D) 10-0.1 parts by weight of epoxy resin, which is not a vinyl ester epoxy resin or an ester of a polyepoxide with an ethylenically unsaturated monocarboxylic acid, and additionally accelerators, and polymerization inhibitors, and
   b) 0.4-1.2 parts by weight of a hardener component comprising an organic peroxide, and
   c) 40-55 parts by weight of a filler component; wherein said organic peroxide hardener and said preaccelerated resin component are contained, separate from each other, in different chambers.
2. The destructible multiple chamber cartridge according to claim 1, wherein said destructible multiple chamber cartridge is fashioned as a dual chamber cartridge.
3. The destructible multiple chamber cartridge according to claim 1, wherein said destructible multiple chamber cartridge consists of glass.
4. The destructible multiple chamber cartridge according to claim 3, wherein said destructible multiple chamber cartridge has a weight ratio of
   A) 20 to 35 parts by weight of cartridge glass,
   B) 18 to 25 parts by weight of the preaccelerated resin component,
   C) 0.4 to 1.2 parts by weight of peroxide hardener, and
   D) 40 to 55 parts by weight of the filler component.
5. The destructible multiple chamber cartridge according to claim 4, wherein the filler component consists of fine-grained quartz, magnesia clinker or marble meal.
6. The destructible multiple chamber cartridge according to claim 1, wherein the unsaturated polyester resin (C) comprises o-phthalic acid or m-phthalic acid or a mixture thereof, with ethylene glycol, propylene glycol, trycyclodecan dimethanol, neopentyl glycol or a mixture of two or more of these.
7. The destructible multiple chamber cartridge according to claim 1, wherein the epoxy resin (D) is composed on the basis of epichlorohydrene and bisphenol A.
8. The destructible multiple chamber cartridge according to claim 1, wherein the vinyl ester epoxy resin (A) has a mean mole mass of 450 to 1200 Dalton.
9. The destructible multiple chamber cartridge according to claim 1, wherein the vinyl ester epoxy resin (A) has an ester number of 80 to 150 mg KOH/g resin.

10. The destructible multiple chamber cartridge according to claim 1, wherein the vinyl ester epoxy resin (A) in the form of a solution of 55 to 70% wt (A) in the monomer used, based on the overall weight of the solution, has a viscosity of 400 to 1000 mPa s at 23° C.

11. The destructible multiple chamber cartridge according to claim 1, wherein the unsaturated polyester resin (C) has an ester number of 180 to 320 mg KOH/g resin.

12. The destructible multiple chamber cartridge according to claim 1, wherein the unsaturated polyester resin (C) in the form of 50 to 70% wt (C) in the monomer used, based on the overall weight of the solution, has a viscosity of 800 to 6000 mPa at 23° C.

13. The destructible multiple chamber cartridge according to claim 1, wherein the epoxy resin (D) has an epoxy equivalent weight of 160 to 200 g/equivalent.

14. The destructible multiple chamber cartridge according to claim 1, wherein the epoxy resin (D) has at 23° C. a viscosity of 2500 to 4000 mPa s.

* * * * *